US012789218B2

(12) United States Patent
Chiu

(10) Patent No.: US 12,789,218 B2
(45) Date of Patent: Nov. 10, 2026

(54) SPRAY HAND CONTROL TUBE

(71) Applicant: Ningbo Ditai Plastic Co., Ltd., Ningbo (CN)

(72) Inventor: Shih-Feng Chiu, Ningbo (CN)

(73) Assignee: Ningbo Ditai Plastic Co., Ltd., Ningbo (CN)

( * ) Notice: Subject to any disclaimer, the term of this patent is extended or adjusted under 35 U.S.C. 154(b) by 188 days.

(21) Appl. No.: 18/792,041

(22) Filed: Aug. 1, 2024

(65) Prior Publication Data

US 2025/0326000 A1 Oct. 23, 2025

(30) Foreign Application Priority Data

Apr. 22, 2024 (CN) ......................... 202420834386.5

(51) Int. Cl.
*B05B 15/656* (2018.01)

(52) U.S. Cl.
CPC .................................. *B05B 15/656* (2018.02)

(58) Field of Classification Search
CPC ..... F16L 27/12; F16L 27/127; F16L 27/1273; F16L 39/04; F16L 39/06; B05B 15/656
See application file for complete search history.

(56) References Cited

U.S. PATENT DOCUMENTS 6,883,208 B1 * 4/2005 Huang .................. B05B 15/656 16/110.1
7,774,901 B1 * 8/2010 Huang .................. B05B 15/656 16/113.1
8,677,595 B2 * 3/2014 Zeng ..................... B05B 15/656 29/434
8,683,657 B2 * 4/2014 Lin ....................... B05B 15/656 16/429
8,684,620 B2 * 4/2014 Lin ....................... B05B 15/656 81/177.2
9,205,549 B1 * 12/2015 Lin ....................... B05B 15/656
2007/0295571 A1 * 12/2007 Tong ..................... B05B 15/656 191/12 R
2015/0089821 A1 * 4/2015 Troudt .................. B05B 15/656 16/427

(Continued)

FOREIGN PATENT DOCUMENTS

AU 6413400 A * 4/2001 .......... F16L 27/1273
CA 2698649 A1 * 12/2010 .............. F16L 27/12
CN 116336278 A * 6/2023 .............. F16L 27/12

(Continued)

*Primary Examiner* — Matthew Troutman
*Assistant Examiner* — Fannie Kee
(74) *Attorney, Agent, or Firm* — Birchwood IP

(57) ABSTRACT

A spray hand control tube is provided, which includes a telescopic nozzle, a handle, a fixed sleeve, and a fixed tube. A right end of the fixed tube is fixedly installed with the handle, the fixed tube is slidably provided with the telescopic nozzle. The telescopic nozzle and the handle are slidably sleeved, an upper end surface of the telescopic nozzle is provided with a plurality of limit holes at equidistant. The handle is provided with a pressing piece, which is inserted into the limit holes by an elastic latch to limit telescopic amounts of the telescopic nozzle and the handle. Two ends of the telescopic nozzle are provided with a connection sleeve, which is made of silicone material and slides with the fixed tube and the telescopic nozzle.

5 Claims, 5 Drawing Sheets

(56) References Cited

U.S. PATENT DOCUMENTS

| | | | | |
|---|---|---|---|---|
| 2015/0217320 | A1 * | 8/2015 | Bonzer | B05B 15/656<br>239/587.4 |
| 2023/0063067 | A1 * | 3/2023 | Lin | B05B 15/656 |

FOREIGN PATENT DOCUMENTS

| | | | | | |
|---|---|---|---|---|---|
| DE | 3931639 | A1 | * | 4/1991 | B05B 15/656 |
| DE | 202013008483 | U1 | * | 1/2014 | B05B 15/656 |
| FR | 2733407 | A1 | * | 10/1996 | F16L 27/1273 |
| GB | 2544105 | A | * | 5/2017 | F16L 27/1273 |
| IT | UB20161063 | A1 | * | 8/2017 | F16L 27/12 |
| JP | 09253013 | A | * | 9/1997 | F16L 27/12 |
| JP | 10052388 | A | * | 2/1998 | F16L 27/12 |
| KR | 20070016449 | A | * | 2/2007 | F16L 27/127 |
| KR | 20170141014 | A | * | 12/2017 | F16L 27/12 |
| NO | 20171579 | A1 | * | 4/2019 | F16L 27/12 |
| WO | WO-9935409 | A1 | * | 7/1999 | F16L 27/1273 |

* cited by examiner

SPRAY HAND CONTROL TUBE

CROSS-REFERENCE TO RELATED APPLICATIONS

This application claims priority to Chinese Patent Application No. 202420834386.5, filed on Apr. 22, 2024, which is hereby incorporated by reference in its entirety.

TECHNICAL FIELD

The present disclosure relates to the field of spraying equipment technologies, and in particular, to a spray hand control tube.

BACKGROUND

Sprinklers are widely used, such as agricultural drug sprayers, pharmaceutical sprayers, etc. By extending a spraying range through a spraying tube, they can adapt to narrow areas and improve a spraying efficiency.

The existing spray pipes are generally equipped with a manual switch, but lack an effect of extension and contraction, which limits the applicability.

Therefore, a spray hand control tube to address the above issues is provided.

SUMMARY

A purpose of the present disclosure is to provide a spray hand control tube to solve the problems raised in the background technology.

To achieve the above objectives, the present disclosure provides the following technical solution: a spray hand control tube, including a telescopic nozzle, a handle, a fixed sleeve, and a fixed tube; a right end of the fixed tube is fixedly installed with the handle, the fixed tube is slidably provided with the telescopic nozzle; the telescopic nozzle and the handle are slidably sleeved relative to each other;

an upper end face of the telescopic nozzle is provided with a plurality of limit holes at equidistant; the handle is provided with a pressing piece, which is inserted into the limit holes by an elastic latch to limit telescopic amounts of the telescopic nozzle and the handle;

two ends of the telescopic nozzle are provided with a connection sleeve, the connection sleeve is made of silicone material and slides with the fixed tube and the telescopic nozzle.

In an embodiment of the present disclosure, an outside of the fixed tube is sleeved with the fixed sleeve, and the handle abuts against the fixed sleeve.

In an embodiment of the present disclosure, an upper surface of the handle is provided with a limit fixing seat, a pressing piece is slidably provided in a pressing groove.

In an embodiment of the present disclosure, the pressing piece includes a button shell, a lower surface of the button shell is integrally provided with a limit socket; a middle of the limit socket is provided with a spring, a lower end of the spring abuts against a limit plug; a side of the limit plug is symmetrically and integrally provided with a guide rod.

In an embodiment of the present disclosure, the limit socket is slidably connected with the limit fixing seat and movable relative to the limit fixing seat in a radial direction.

In an embodiment of the present disclosure, sides of the limit socket and the limit fixing seat are both provided with a V-shaped opening, the guide rod moves in the V-shaped opening.

Compared with existing technology, the beneficial effects of the present disclosure are the following.

1. By a sliding setting of the fixed tube and telescopic nozzle, a spraying range can be adjusted, rendering it more widely applicable.
2. By providing with a limit piece on the handle to limit a telescopic amount of the telescopic nozzle, the adjustment of the telescopic amount of the telescopic nozzle is more convenient. The limit piece is a press trigger type, with a simple structure and easy operation, without a need to press the telescopic nozzle for a long time.

Numeral reference: 1. telescopic nozzle; 11. limit hole; 12. connection sleeve; 2. handle; 21. pressing groove; 22. limit fixing seat; 3. fixed sleeve; 4. fixed tube; 5. pressing piece; 51. button shell; 52. spring; 53. limit plug; 54. guide rod; 55. limit socket.

DESCRIPTION OF EMBODIMENTS

The following will provide a clear and complete description of the technical solution in the embodiments of the present disclosure, based on the accompanying drawings. Obviously, the described embodiments are only a part of the embodiments of the present disclosure, not all of them. Based on the embodiments in the present disclosure, all other embodiments obtained by ordinary skilled persons in this field without creative work are within the protection scope of the present disclosure.

Figure 1:
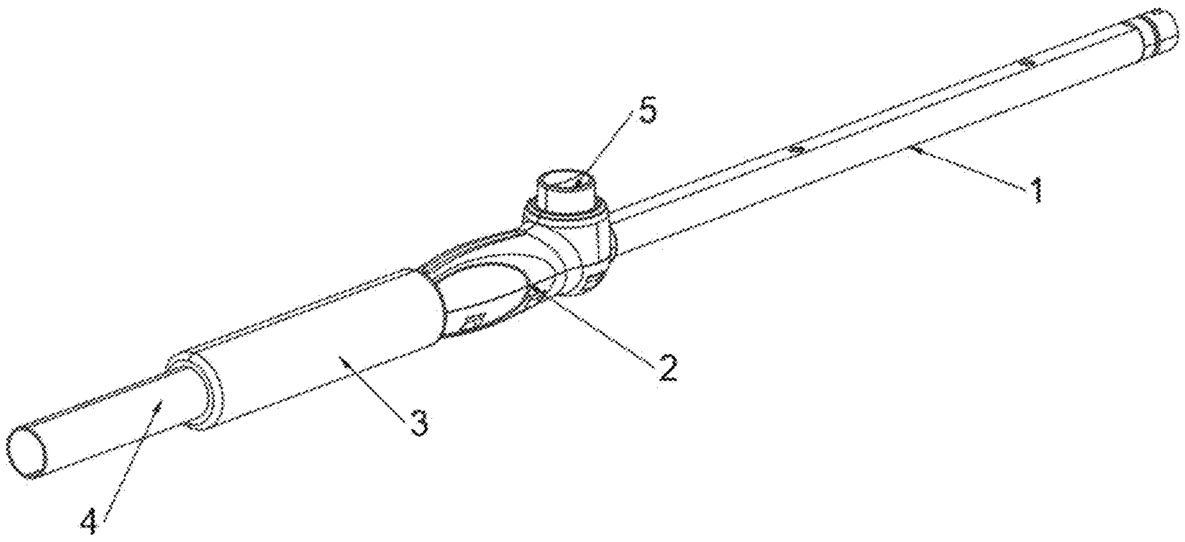
FIG. 1 is a schematic structural diagram of the present disclosure.
Figure 2:
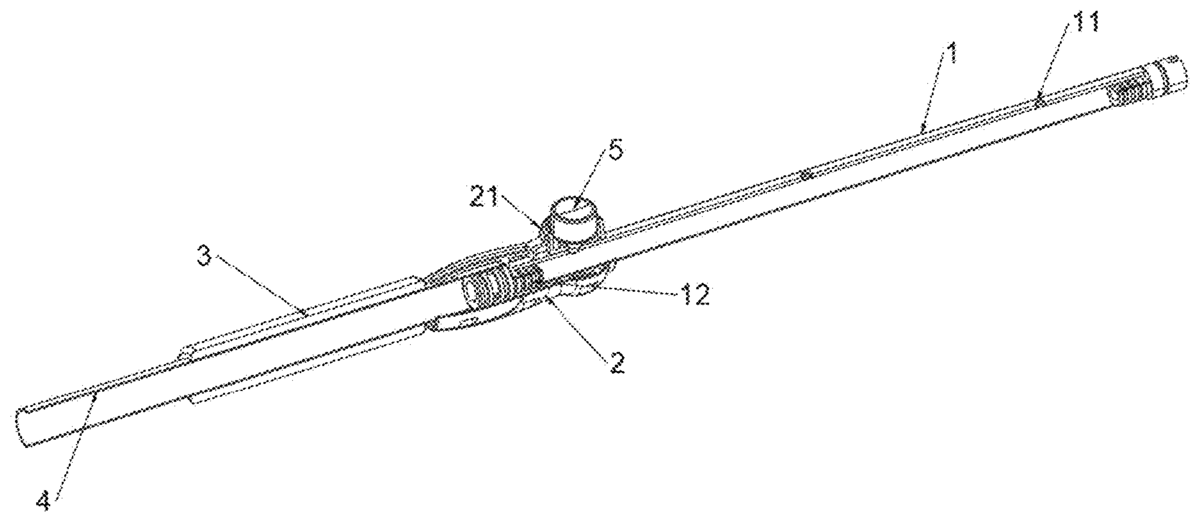
FIG. 2 is a sectional view of the present disclosure.
Figure 3:
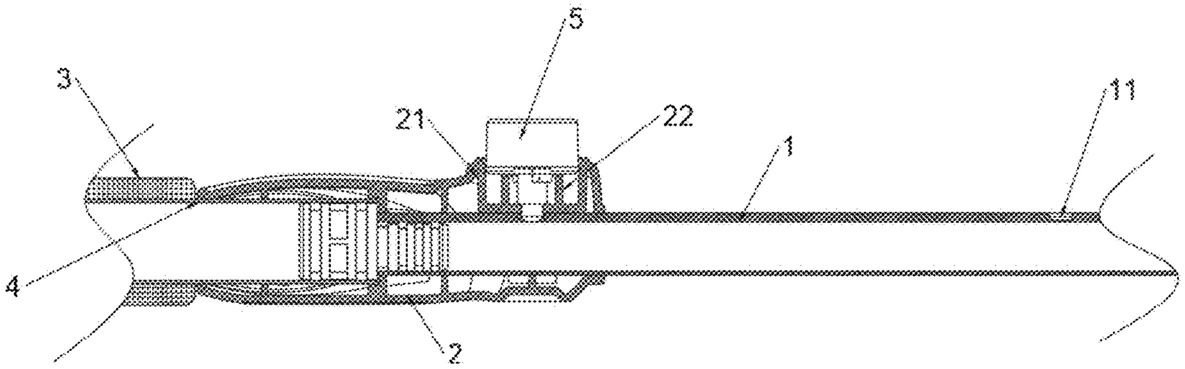
FIG. 3 is a partial sectional view of the present disclosure.
Figure 4:
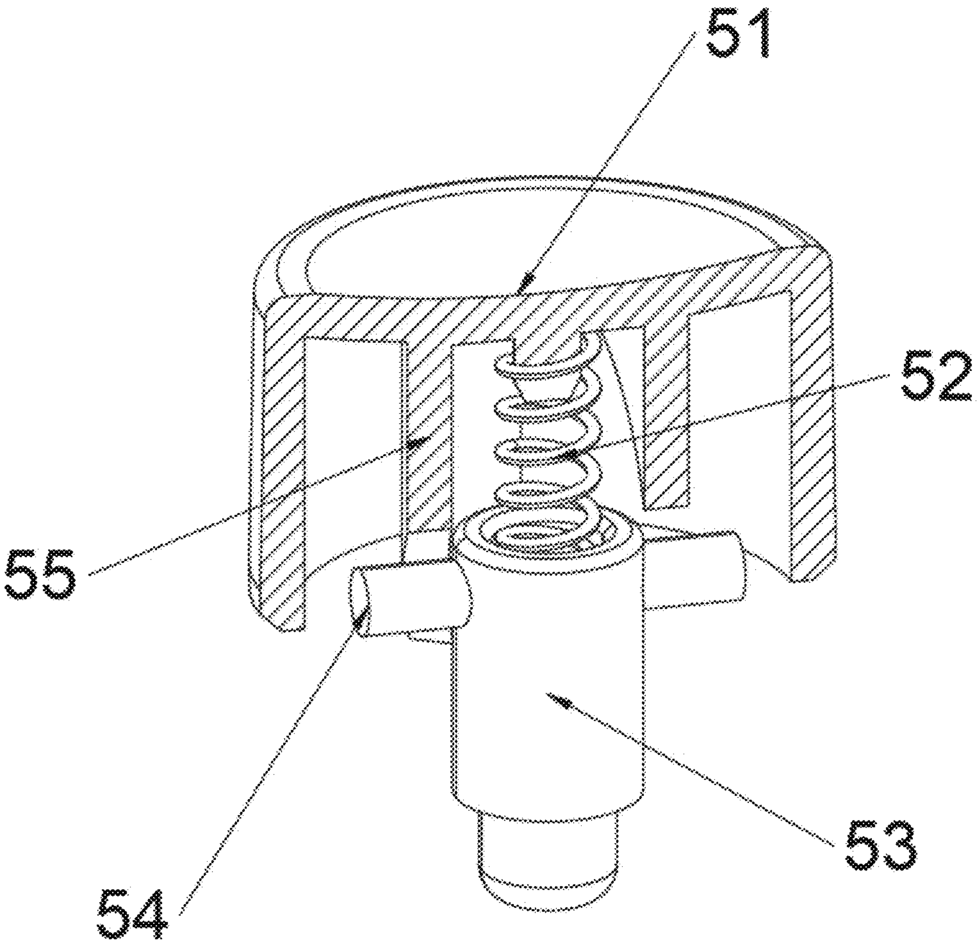
FIG. 4 is a schematic structural diagram of a pressing piece in the present disclosure.
Figure 5:
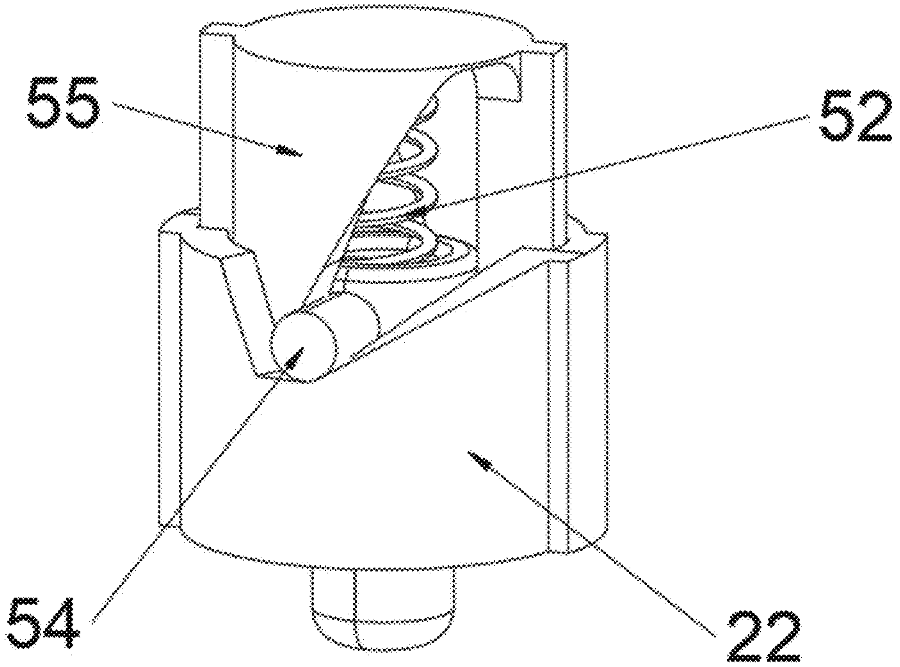
FIG. 5 is a schematic structural diagram of the pressing piece and a limit fixing seat in the present disclosure.

Please refer to FIGS. 1-5. The present disclosure provides a technical solution: a spray hand control tube, including a telescopic nozzle 1, a handle 2, a fixed sleeve 3, and a fixed tube 4. An outside of the fixed tube 4 is sleeved with the fixed sleeve 3, a right end of the fixed tube 4 is fixedly installed with the handle 2, the handle 2 abuts against the fixed sleeve 3.

The fixed tube 4 is slidably provided with the telescopic nozzle 1, the telescopic nozzle 1 and the handle 2 are slidably sleeved relative to each other.

The handle 2 is provided with a pressing piece 5, which is configured to limit telescopic amounts of the telescopic nozzle 1 and the handle 2.

In an implementation, an upper end face of the telescopic nozzle 1 is provided with a plurality of limit holes 11 at equidistant.

An upper surface of handle 2 is provided with a pressing groove 21, a bottom of the pressing groove 21 is integrally provided with a limit fixing seat 22. The pressing piece 5 is slidably provided in the pressing groove 21.

The pressing piece 5 includes a button shell 51, a lower surface of the button shell 51 is integrally provided with a limit socket 55. A middle of the limit socket 55 is provided with a spring 52, a lower end of the spring 52 abuts against a limit plug 53. A side of the limit plug 53 is symmetrically and integrally provided with a guide rod 54.

The limit socket 55 is slidably connected with the limit fixing seat 22, and is movable relative to the limit fixing seat 22 in a radial direction.

Sides of the limit socket 55 and the limit fixing seat 22 are both provided with a V-shaped opening, and the guide rod 54 can move inside the V-shaped opening.

When the button shell 51 is pressed, the spring 52 is compressed, and the limit socket 55 and the limit fixing seat 22 press the guide rod 54 to slide diagonally upwards, the limit plug 53 is caused to detach from the limit hole 11. At this time, the telescopic nozzle 1 and the fixed tube 4 slide relatively freely. When the telescopic nozzle 1 and the fixed tube 4 need to be fixed, corresponding limit holes 11 are moved below the pressing piece 5, the button shell 51 is released, the spring 52 is reset, the button shell 51 is lift, and at the same time, the limit plug 53 slides downwards and is inserted into the limit hole 11, thereby achieving a latch type relative fixation.

Two ends of the telescopic nozzle 1 are provided with a connection sleeve 12, which is made of silicone material. The connection sleeve 12 slides along with the telescopic nozzle 1 and the fixed tube 4, thereby increasing a sealing effect between the telescopic nozzle 1 and the fixed tube 4 during sliding by the connection sleeve 12.

Working principle: by a sliding setting of the fixed tube 4 and the telescopic nozzle 1, the spraying range can be adjusted. By providing with a limit piece on the handle 2 to limit the telescopic amount of the telescopic nozzle 1, the adjustment of the telescopic amount of the telescopic nozzle 1 is more convenient. The limit piece is a press trigger type, with a simple structure and easy operation, without a need to press the telescopic nozzle 1 for a long time.

The content not described in detail in this specification belongs to the existing technology known for those skilled in the art.

Although the embodiments of the present disclosure have been shown and described, it will be understood by those skilled in the art that various changes, modifications, substitutions, and variations can be made to these embodiments without departing from the principles and spirit of the present disclosure. The scope of the present disclosure is limited by the appended claims and their equivalents.

What is claimed is:

1. A spray hand control tube, comprising: a telescopic nozzle, a handle, a fixed sleeve, and a fixed tube; a right end of the fixed tube is fixedly installed with the handle, wherein the fixed tube is slidable relative to the telescopic nozzle; and the telescopic nozzle and the handle are slidable relative to each other;

wherein an upper end face of the telescopic nozzle is provided with a plurality of limit holes at equidistant, spacing; and the handle is provided with a pressing piece, which is inserted into the plurality of limit holes by an elastic latch; and each of the two ends of the telescopic nozzle is provided with a connection sleeve, wherein the connection sleeve is made of silicone material and is configured to slide with the fixed tube and the telescopic nozzle, wherein the pressing piece comprises a button shell, a lower surface of the button shell is integrally provided with a limit socket; a middle of the limit socket is provided with a spring, a lower end of the spring abuts against a limit plug; and a side of the limit plug is symmetrically and integrally provided with a guide rod.

2. The spray hand control tube according to claim 1, wherein an outside surface of the fixed tube is sleeved with the fixed sleeve, and the handle abuts against the fixed sleeve.

3. The spray hand control tube according to claim 1, wherein an upper surface of the handle is provided with a pressing groove having a limit fixing seat, and the pressing piece is provided in the pressing groove.

4. The spray hand control tube according to claim 3, wherein the limit socket is slidably connected with the limit fixing seat and movable relative to the limit fixing seat in a radial direction.

5. The spray hand control tube according to claim 4, wherein sides of the limit socket and the limit fixing seat are both provided with a V-shaped opening, and the guide rod moves in the V-shaped opening.

* * * * *